United States Patent [19]
Estienne

[11] 3,727,130
[45] Apr. 10, 1973

[54] NUMERICAL DISPLAY DISTORTION METER

[75] Inventor: Pierre Estienne, Rosny-sous-Bois, France

[73] Assignee: Compagnie Industrielle Des Telecommunications, Paris, France

[22] Filed: Oct. 28, 1971

[21] Appl. No.: 193,443

[30] Foreign Application Priority Data

Oct. 28, 1970 France..................................7038963

[52] U.S. Cl...................324/77 A, 325/42, 325/323, 238/162, 332/37 R
[51] Int. Cl. .............................................G01r 23/16
[58] Field of Search........................324/77 H, 77 A; 328/162; 325/42, 323, 473; 332/37 R

[56] References Cited

UNITED STATES PATENTS

| | | | |
|---|---|---|---|
| 3,462,693 | 8/1969 | McCowen | 328/162 |
| 3,579,109 | 5/1971 | Hatley | 328/162 X |

*Primary Examiner*—Stanley T. Krawczewicz
*Attorney*—Craig, Antonelli and Hill

[57] ABSTRACT

A numerical display distortion meter for signals featuring amplitude transitions at instants characteristic of the data embodied in the signals includes first and second counters of clock pulses, reset means responsive to the transitions in the distorted signal for resetting the first counter only if its count exceeds half its capacity and for resetting said second counter only if its count is less than half its capacity, and means for determining the time difference between the counts in said first and second counters at the end of an operation cycle.

10 Claims, 4 Drawing Figures

NUMERICAL DISPLAY DISTORTION METER

The invention relates to a numerical display distortion meter for signals featuring amplitude transitions at instants characteristic of the data embodied in the signals, and provides an indication of the degree of isochronous distortion. The distortion meter is able to provide a numerical indication, preferably as a percentage value to the nearest 0.1 percent, of the isochronous distortion measured in a predetermined time interval which will be referred to hereinafter as a measurement cycle. The distortion meter may be used for testing telegraphic receivers, telegraphic transmission systems employing such signals, either during manufacture or servicing or in service.

In a telegraph link, a significant instant is defined by the start of a particular state of an element carrying out the restitution of the received characteristic signal corresponding to each of the quantified values of the characteristic chosen to form the telegraphic modulation. A significant interval of the signal is defined by the period between successive significant instants. In a system using isochronous modulation, an elemental interval is defined such that the theoretical durations of the significant intervals of a signal are all multiples of this elemental interval. The degree of isochronous distortion may be defined by the ratio D/T where T is the elemental interval and D is the maximal value of the algebraic difference between the interval between two significant instants (not necessarily consecutive) and the corresponding theoretical intervals. The indication of this degree of distortion is generally accompanied by an indication of the interval of time during which the observation was made, that is, the duration of the measurement cycle.

In the restitution of a received telegraphic signal the significant instants, or amplitude transitions in this case, generally do not coincide with the theoretical instants, which are spaced by an integral number of elemental intervals from a first transition taken as origin. Certain transitions are in advance of the theoretical instant at which they should occur, and others lag behind. During a measurement cycle of finite length, a certain number of delays $r1, r2 \ldots ri$ and a certain number of advances $a1, a2 \ldots aj$ will be observed. There will be a largest delay $rM$ and a largest advance $aM$. The quantity D defined above has the value of $rM/aM$, and the degree of isochronous distortion may be expressed, as a percentage, by:

$$(rM + aM)/T \cdot 100$$

The evaluation of the isochronous distortion therefore consists in finding the arithmetic sum of the greatest delay and the greatest advance observed during the measurement cycle.

In accordance with the present invention a numerical display distortion meter for signals featuring amplitude transitions at instants characteristic of the data embodied in the signals includes a source of clock pulses spaced from one another by a predetermined fraction of a significant interval of the distorted signal, first and second counters of the clock pulses, each having a capacity equal to the number of clock pulses occurring during a predetermined fixed elemental interval, and reset circuitry operable to reset the first counter in responses to amplitude transitions in the distorted signal occurring while the count in that counter exceeds half its capacity, and operable to reset the second counter in response to amplitude transitions in the distorted signal occurring while the count in that counter is less than half its capacity.

The invention will now be described in more detail, by way of example only and with reference to the accompanying diagrammatic drawings in which.

Figure 1:
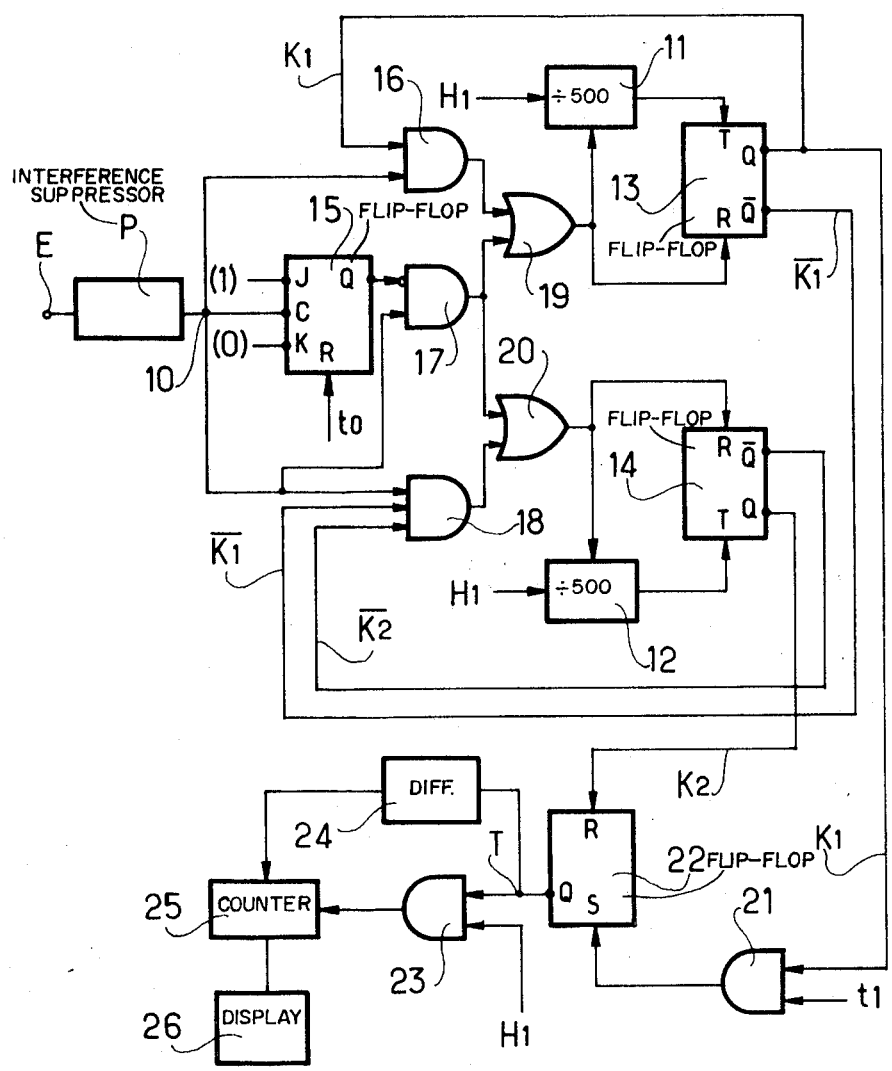
FIG. 1 is a block diagram of the distortion meter.

Referring to FIG. 1, a received signal featuring amplitude transitions at instants characteristic of the data embodied in the signals, in this example isochronous telegraphic signals, are applied to a terminal E at the input of an interference suppressor P which will be described in more detail below. The output of the suppressor P is connected to a terminal 10.

A clock pulse generator (not shown) provides clock pulses with a regular period equal to one thousandth of the elemental interval of the telegraph signals. Connections to the clock pulse generator are indicated H1 in the Figure.

The clock pulses are received by a first modulo 1,000 counter, which will be referred to as counter C1 although this reference does not appear in the figure, comprising a divider by 500 11, forming a modulo 500 counter, connected in series with a divider by 2 in the form of a triggered flip-flop 13. The counter C1 thus includes an input counter (11) of half the total counter capacity and an output flip-flop (13).

The direct output Q of the flip-flop 13 provides a signal K1 and the complementary output $\overline{Q}$ which provides the complementary signal $\overline{K1}$. When the count in counter C1 is between 0 and 499, K1 equals 0. Where the count is from 500 to 999, K1 equals 1.

The clock pulses are also received by a second modulo 1,000 counter, which will be referred to as counter C2, comprising a modulo 500 counter 12 in series with a flip-flop 14. This second counter is thus substantially identical to the first counter C1. The direct output Q of the flip-flop 14 provides a signal K2, the complementary output $\overline{Q}$ providing the complementary signal $\overline{K2}$. When the count of counter C2 is between 0 and 499, K2 equals 0, and when the count is from 500 to 999, K2 equals 1.

Terminal 10 is connected to the C input of a JK flip-flop 15. The J input of this flip-flop is held permanently at logic 1 and the K input at logic 0. A reset input R of the flip-flop 15 is connected to receive a signal defining an instant $t_0$ signifying the beginning of a measurement cycle. This signal may be provided manually by an operator of the distortion meter.

The direct output Q of the flip-flop 15 is connected to an inhibit input of an AND-gate 17, a second input of which is connected directly to terminal 10.

An AND-gate 16 has one input connected to terminal 10 and its other input connected to the direct output Q of flip-flop 13 to receive the signal K1.

A further AND-gate 18 has a first input connected to terminal 10, a second input connected to the complementary output $\overline{Q}$ of flip-flop 14 to receive the signal $\overline{K2}$, and a third input connected to the complementary output $\overline{Q}$ of flip-flop 13 to receive the signal $\overline{K1}$.

An OR-gate 19 has one input connected to the output of gate 16 and a second input connected to the output of gate 17. Another OR-gate 20 has one input connected to the output of gate 17 and a second input connected to the output of gate 18. The output of gate 19 is connected to reset inputs of the counter 11 and flip-flop 13. The output of gate 20 is connected to reset inputs of the counter 12 and flip-flop 14.

A further AND-gate 21 has one input connected to receive the signal K1, and a second input connected to receive a signal defining an instant $t_1$ after instant $t_o$. The output of this gate is connected to the S input of a flip-flop 22 whose R input is connected to receive the signal K2. The direct output Q of flip-flop 22 is connected to one input of an AND-gate 23 the other input of which receives the clock pulses. Pulses issuing from the output of gate 23 are counted in a counter 25, a rest input of which is connected through a differentiating circuit 24 to receive the signal T appearing at the Q output of the flip-flop 22.

At the end of the measurement cycle, the count of counter 25 is displayed in an element 26, and indicates the degree of isochronous distortion, as a percentage to the nearest 0.1 percent.

The operation of the distortion meter will now be described, with reference to FIG. 2.

Figure 2:
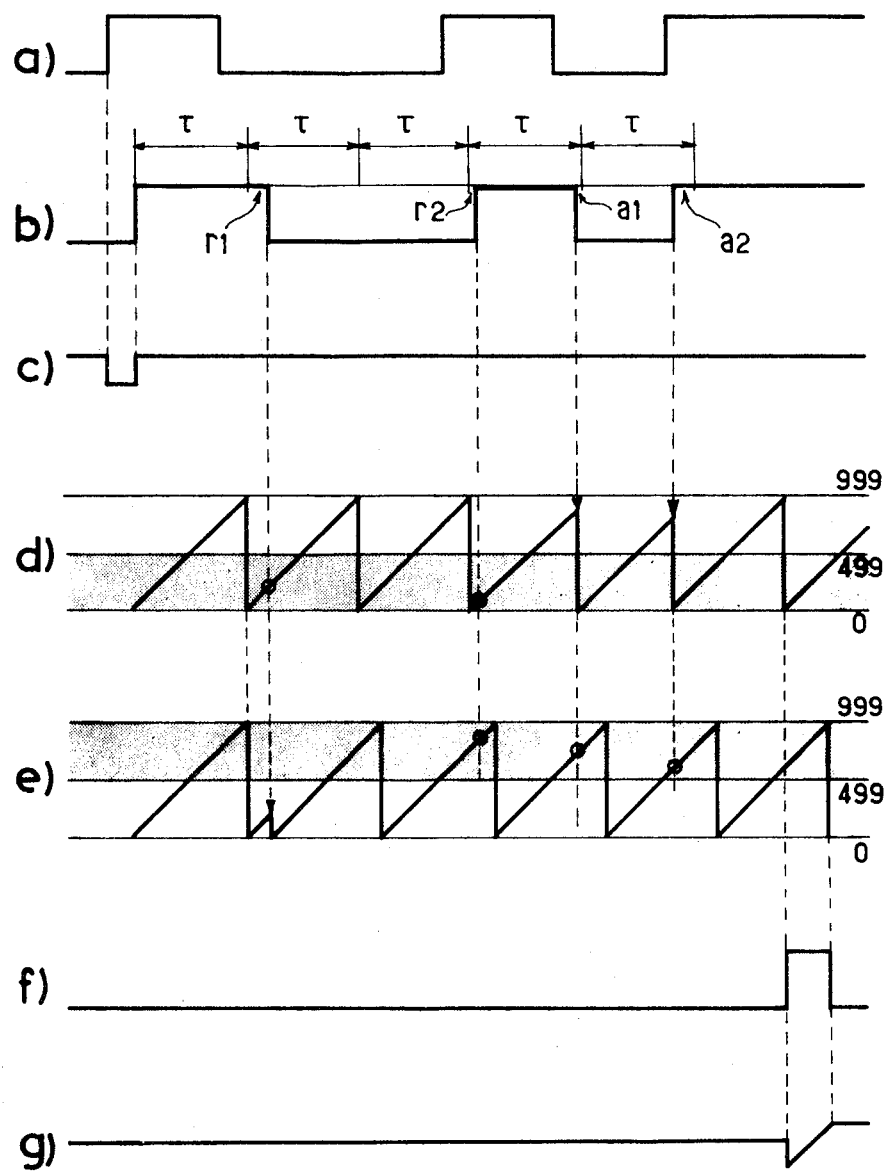
FIG. 2 shows signals at various points in the distortion meter during a measurement cycle.

Line (a) of FIG. 2 shows a transmitted telegraph signal, and line (b) shows the reconstituted signal as received. The elemental periods are shown in line (b), starting at the first transition in the received signal. The second transition involves a delay $r1$, with respect to the end of the elemental interval at which it should theoretically occur. The third transition involves a delay $r2$; the fourth involves an advance $a1$; and the fifth involves an advance $a2$. $r1$ is greater than $r2$, and $a2$ greater than $a1$.

Line (c) shows the logic value at the direct output Q of the flip-flop 15. Initially at logic 1, this output passes to logic 0 at a time $t_o$, defining the beginning of a measurement cycle. At the first amplitude transition in the received signal following this instant $t_o$, the Q output returns to logic 1.

Lines (d) and (e) show the counts in counter 11, 12, respectively. When the Q output of flip-flop 15 is at logic 0, gate 17 is open. The first transition in the received signal then passes through it and through gates 19 and 20 to reset counters 11 and 12 and flip-flops 13 and 14 to zero.

The second transition is blocked by gate 16 (K1 = 0), but passes through gate 18 ($\overline{K1}$ and $\overline{K2}$ = 1) and gate 20, to reset counter 12 and flip-flop 14 to zero. This is clearly seen in line (e) of FIG. 2.

The third transition is blocked by gate 16 (K1 = 0) and also by gate 18 (K2 = 1). This transition has no effect on either counter.

The fourth transition passes through gate 16 (K1 = 1), being blocked by gate 18 (K2 = 1). It resets counter 11 to zero. as is clearly seen in line (d).

The fifth transition is blocked by gate 18 (K2 = 1) but passes through gate 16 (K1 = 1) to reset counter 11 to zero. Once again, this is clearly seen in line (d) of FIG. 2.

In FIG. 2 the dotted lines running vertically from each signal transition carry an arrowhead where they reset a counter to zero and a circle where they are without effect on that counter.

At the first zero state of counter 11 after time $t_1$, which defines the end of the measurement cycle and is suitably provided manually by the operator, the flip-flop 22 passes from logic 0 to logic 1, this signal T is differentiated in circuit 24 to produce a narrow pulse which resets counter 25 to zero. This counter begins to count the lock pulses arriving through gate 23. At the next zero state of counter 12, flip-flop 22 is reset to zero by a signal applied to its reset input R, and signal T once again has the logic value 0, closing gate 23 to stop the count in counter 25.

It can be shown that a transition coinciding with states K1 = 1 and K2 = 0 corresponds to a distortion level exceeding 50 percent. Without the connection of signal $\overline{K1}$ to gate 18, this would have the effect of resetting both counters 11 and 12 to zero, so that the distortion of more than 50 percent would be displayed as zero distortion. The application of the signal $\overline{K1}$ to gate 18 is precisely intended to avoid this possibility of error.

In FIG. 2, line (f) shows the output of flip-flop 22 and line (g) the count in counter 25. When the count in counter 25 is halted, the total count value is displayed by element 26, and is the distortion level as a percentage, to the nearest 0.1 percent.

Figure 3:
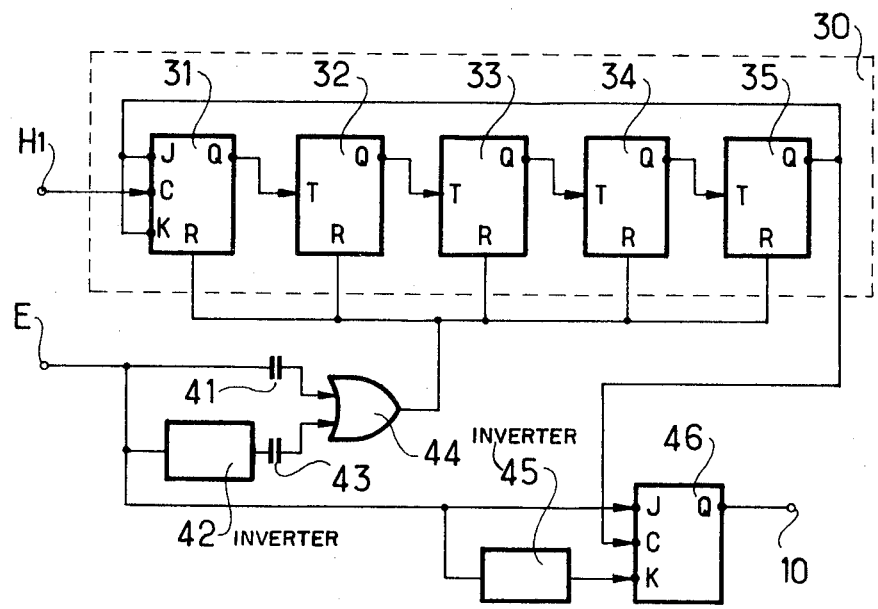
FIG. 3 shows part of the distortion meter in more detail.

The interference suppressor P of FIG. 1 will now be described in more detail with reference to FIGS. 3 and 4. This suppressor is intended to prevent the distortion meter from reacting to an interference pulse as a signal transition. An apparent transition will be defined as an interference pulse if the corresponding change in amplitude lasts less than a predetermined interval, which in the present example is 1.6 percent of the elemental interval, that is the duration of 16 clock pulses.

The received signal on input E is applied to a differentiator 41 shown symbolically as a capacitance, and through an inverter 42 to a further differentiator 43, also shown symbolically as a capacitance. The differentiator outputs are connected to respective inputs of an OR-gate 44 whose output is connected to a reset input R of each of five flip-flops making up a counter 30.

The counter 30 includes an input JK flip-flop 31 and four triggered flip-flops 32 to 35, the five flip-flops being connected in cascade. The Q output of flip-flop 31 is connected to the T input of flip-flop 32, the Q output of each of flip-flops 32 to 34 being connected to the T input of the next flip-flop, and the Q output of the flip-flop 35 being connected to the J and K inputs of flip-flop 31. The counter 30 is a modulo 32 counter, but state 16 is indicated by the first appearance of logic 1 on the Q output of flip-flop 35.

It will be appreciated that a modulo 16 counter could be used with appropriate circuitry for decoding state 16, but the arrangement just described has the advantage of greater simplicity than such arrangements.

The clock pulses are applied to the C input of flip-flop 31.

The Q output of flip-flop 35 is connected to the C input of a JK flip-flop 46 whose J input is connected to input E and whose K input is connected to that input through an inverter 45. The output Q of flip-flop 46 is connected to terminal 10.

Figure 4:
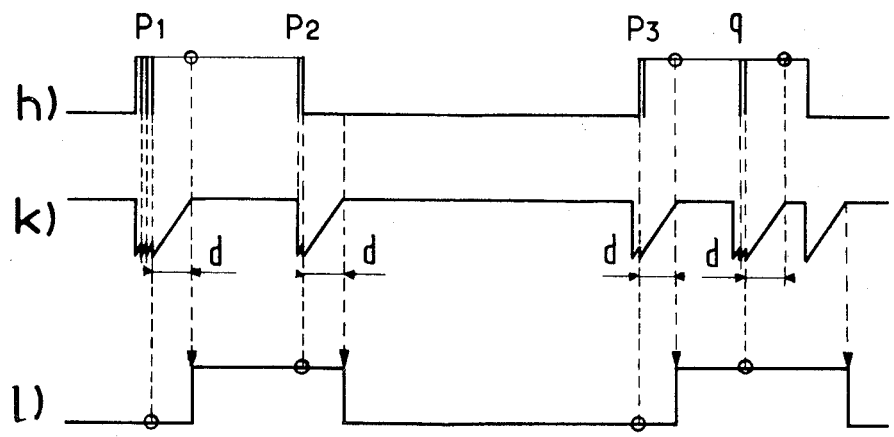
FIG. 4 shows further signals occurring during a measurement cycle.

Line (*h*) in FIG. 4 shows a received telegraphic signal including interference pulses. These are of two types, "rebounds" occurring with amplitude transitions and analogous to "ringing" in other forms of circuit, as indicated at P1, P2 and P3. Others are externally generated, as those indicated at *q* for example.

Line (*k*) shows the count of counter 30. Each transition or apparent transition in the received signal resets this counter to zero. To reach state 16 requires a period indicated d in the figure and equal to 1.6 percent of the elemental interval.

If an apparent transition is not followed by counter 30 achieving state 16, that is to say if the change of amplitude following that apparent transition does not last the predetermined interval *d*, it is recognized as an interference pulse.

Only when counter 30 achieves this state after an apparent transition is the transition recognized as genuine and "memorized" by appropriately changing the state of flip-flop 46.

As is clearly seen from line (*l*) in FIG. 4, the output signal of flip-flop 46 consists of the received signal from which the interference pulses of both types have been suppressed.

The operation of the distortion meter as just described evaluates the distortion value as follows: Each delay *r* or advance *a* is indicated by a corresponding count in one of counters 11 or 12. For example, delay *r*1 is indicated by the value at which counter 12 is reset to zero at the second transition in the received signal (see lines (*e*) and (*d*) in FIG. 2).

The counters 11 and 12 continually count the clock pulses. Each time a transition occurs in the received signal, a reset order for the counters is given, but the counters react differently to this order. In effect, the first counter is only reset in response to transitions occurring while the count therein exceeds half its capacity, that is to say is from 500 to 999, and the second counter is reset only in response to transitions occurring while its count is less than half its capacity, that is to say from 0 to 499. Thus, as shown in line (*d*) of FIG. 2, counter 11 is not reset when the vertical dotted line from a signal transition crosses the line indicating the count value in the shaded area from 0 to 499. Similarly, as shown in line (*e*) counter 12 is not reset when these lines cross the count line in the shaded area extending from 500 to 999.

Consequently, each time counter 11 is reset to zero before reaching its full count, a particular delay is recorded, and each time counter 12 is reset to zero before attaining its full count, a corresponding advance is recorded.

Each time one of the counters is reset to zero, this has the effect of changing the phase of the sawtooth waveform indicating the count. As a consequence of this, any smaller delay than the first noted by counter 11 is regarded by this counter as an advance, and therefore ignored. Any larger delay, however, is recognized as such and recorded to produce a further phase change. Consequently, at the end of a measurement cycle, only the largest delay observed is recorded.

Similarly, only the largest advance is recorded by counter 12, any smaller advance than that already recorded being regarded as a delay and ignored.

At the beginning of the measurement cycle, both counters 11 and 12 are reset to zero. At the end of the cycle, because of the differing phase changes of the two sawtooth waveforms, their count values will differ. As the phase changes are in opposite senses, the difference between the two counts is proportional to the arithmetic sum of the largest delay and the largest advance. As has already been mentioned, this is a measure of the distortion level which may be defined ($rM = aM$) To 100, where $rM$ and $aM$ are the largest delay and advance respectively and T is the elemental interval.

This difference in the counts may be measured by counting the number of clock pulses occurring between the first zero state of one counter at the end of the measurement cycle and the first zero state of the other. By counting these clock pulses in the counter 25 and suitably arranging the display element 26, the degree of distortion is directly displayed.

What is claimed is:

1. A numerical display distortion meter for signals featuring amplitude transitions at instants characteristic of the data embodied in the signals, comprising a clock source of clock pulses spaced from one another by a predetermined fraction of a significant interval of the distorted signal, first and second counters connected to said clock source and each having a capacity equal to the number of clock pulses occurring during a predetermined fixed elemental interval, reset circuit means responsive to said distorted signal for resetting said first counter in response to amplitude transitions in the distorted signal occurring while the count in that counter exceeds half its capacity and for resetting said second counter in response to amplitude transitions in the distorted signal occurring while the count in that counter is less than half its capacity, and means for providing an output signal representing the time difference in the count of said first and second counters at the end of a measurement cycle.

2. A distortion meter as claimed in claim 1 in which each counter includes a respective input counter of half the total counter capacity and a respective output flip-flop having direct and complementary outputs and an input connected to the output of the input counter, and wherein said reset circuit means includes a first AND-gate having a first input connected to receive the distorted signal and a second input connected to the direct output of the output flip-flop of said first counter and a second AND-gate having a first input connected to receive the distorted signal and a second input connected to the complementary output of the output flip-flop of said second counter.

3. A distortion meter as claimed in claim 2 in which said reset circuit means includes means to reset both said first and second counters to zero in response to the first signal transition in a given measurement cycle.

4. A distortion meter as claimed in claim 2 further including inhibit means for inhibiting said reset circuit means from resetting either said first or said second counter in response to a signal transition indicative of a distortion level exceeding a predetermined value.

5. A distortion meter as claimed in claim 4 in which the predetermined value of the distortion level is 50 percent.

6. A distortion meter as claimed in claim 4 in which the second AND-gate has a third input connected to the complementary output of the output flip-flop of said first counter.

7. A distortion meter as claimed in claim 1 wherein said means for providing an output signal comprises logic circuit means including a third counter for counting the clock pulses occurring between the first zero state of the first counter following the end of a measurement cycle and the next zero state of the second counter.

8. A distortion meter as claimed in claim 7 including storage means for storing the amplitude of the distorted signal a predetermined interval after an amplitude transition of that signal or after a final interference pulse of a train of such pulses of total duration less than that predetermined level.

9. A distortion meter as claimed in claim 8 further including a fourth counter comprising a set of flip-flops connected in cascade and whose capacity is twice the number of clock pulses occurring during said predetermined interval, the direct output of the last such flip-flop being applied to said storage means connected to receive the signal.

10. A distortion meter as claimed in claim 1 in which said reset circuit means includes means to reset both said first and second counters to zero in response to the first signal transition in a given measurement cycle.

* * * * *